United States Patent [19]
McDonald

[11] Patent Number: 6,023,365
[45] Date of Patent: Feb. 8, 2000

[54] DMD ILLUMINATION COUPLER

[75] Inventor: Mark McDonald, Mountain View, Calif.

[73] Assignee: Siros Technologies, Inc., San Jose, Calif.

[21] Appl. No.: 09/116,656

[22] Filed: Jul. 16, 1998

[51] Int. Cl.[7] ............................. G02B 26/08; G02B 5/04
[52] U.S. Cl. ..................... 359/291; 359/295; 359/298; 359/831; 359/833; 359/834
[58] Field of Search ........................ 359/831, 833, 359/834, 835, 836, 837, 290, 291, 295, 298

[56] References Cited

U.S. PATENT DOCUMENTS

| | | | |
|---|---|---|---|
| 4,680,579 | 7/1987 | Ott | 340/783 |
| 5,420,655 | 5/1995 | Shimizu | 353/33 |
| 5,548,443 | 8/1996 | Huang | 359/638 |
| 5,552,922 | 9/1996 | Magarill | 359/224 |
| 5,796,526 | 8/1998 | Anderson | 359/671 |

*Primary Examiner*—Georgia Epps
*Assistant Examiner*—Margaret Burke
*Attorney, Agent, or Firm*—Lumen Intellectual Property Services

[57] ABSTRACT

A DMD illumination coupler, and a method of improving the wavefront quality of a transmitted illumination beam over the prior art using the invented DMD illumination coupler are disclosed. The invented DMD illumination coupler comprises an angularly selective reflective thin film. The invented DMD illumination coupler has the characteristics of high optical quality and cost effectiveness. The application of the invented DMD illumination coupler in holographic systems is also discussed.

22 Claims, 4 Drawing Sheets

1

DMD ILLUMINATION COUPLER

GOVERNMENT RIGHTS CLAUSE

This invention was made with Government support under SBIR grant No. NAS5-33257. The Government has certain rights in this invention.

RELATED APPLICATION

This patent application refers to two concurrently filed patent applications: "Reflector-Based Off-Axis Optical System for Holographic Storage" by Lambertus Hesselink et. al., and "Reflector-Based Reference Beam Telescope" by Andrew J. Daiber et. al.

FIELD OF THE INVENTION

This invention relates generally to illumination light couplers of a digital micro-mirror devices (DMD), and especially to a method of transmitting illumination light of high optical quality through a DMD light coupler.

BACKGROUND

Digital micro-mirror device(DMD) is becoming a widely used display apparatus owing to its high contrast, high speed and high resolution. One may refer to U.S. Pat. No. 4,680,579 for details of a DMD apparatus. A DMD consists of a matrix of micro-mirrors contained in a common plane. Each micro-mirror is of miniature size: as small as a few microns. The micro-mirrors are individually adjustable between a first and second position by a voltage applied to each micro-mirror pixel. The respective positions may be identified as "on" and "off". If a particular micro-mirror of a DMD is in the "on" position, an incident illumination light is reflected by this micro-mirror and is delivered to a viewing device. Such reflected illumination light is called "useful" illumination light. If a micro-mirror is in the "off" position, the reflected illumination light is spatially displaced with respect to the light beam reflected by it in the "on" position, and is not received by the viewing device. Illumination light which is reflected by a micro-mirror in "off" position is called "useless" illumination light.

A DMD apparatus can be used in an image projection system as well as a holographic system. In a holographic system, the DMD apparatus is used to encode a signal beam. One may refer to a concurrently filed U.S. Pat. application titled "Mirror-Based Off-Axis Optical System for Holographic Storage" for an example of this application.

In a particular application, a DMD apparatus is often used in conjunction with a light source, an optical system which can couple the illumination light from the light source to the DMD, and can subsequently couple the reflected illumination light from the DMD apparatus to a viewing device. When a DMD is used in an image projection system, the light source is typically a broad band white light source. When a DMD apparatus is used in a holographic storage system, the light source is typically a mono-chromatic coherent laser. The optical system described above is often called an DMD coupler.

One important characteristic of a DMD system is that the miniature sized micro-mirrors cause diffraction of the illumination light. FIG. 1 shows an illumination beam reflected from a micro-mirror pixel of a DMD, forming a diffraction limited reflected beam. In FIG. 1, a DMD 102 comprises a matrix of micro-mirrors 104. The size of each micro-mirror 104, for example, can be as small as 17 micron square. Diffraction effect occurs when an incident light beam 106 is reflected by this micro-mirror pixel 104. The reflected beam 110 has a beam profile which comprises a primary peak 112, a first order diffraction 114, a second order diffraction 116, and higher orders of diffraction which are not shown in the figure. The diffraction cone angle is approximately 1.9 degrees when the first order diffraction is included, and approximately 3.8 degrees when two orders of diffraction are included. When a DMD apparatus is used to encode a signal beam in a holographic system, this diffraction effect reduces the resolution of a holographic storage system, and consequently reduces the capacity of the holographic storage system.

A DMD coupler which couples the illumination light to the DMD, and couples the illumination light reflected by micro-mirrors out of the DMD, is an important part of a DMD system. Examples of such DMD couplers are taught in U.S. Pat. No. 5,552,922, and U.S. Pat. No. 5,420,655. FIG. 2 is a schematic drawing illustrating a DMD coupler taught in the prior art. Illumination beam 200 is totally reflected at an air gap 214 between a prism 212 and a prism 216. The refracted illumination beam 206 is reflected by a micro-mirror 104 of a DMD 102. The reflected beam 208 is incident on the interface of prism 212 and the air gap 214 at an angle which is smaller than the critical angle. The reflected beam 206 passes the air gap 214 and exits the DMD coupler, forming an output beam 210. Light beam 208 is diffraction limited due to the diffraction at the micro-mirrors. Refraction of this diffraction limited beam 208 by the air gap 214 leads to a decrease of the optical quality of the system. Such reduction of the optical quality is detrimental to a holographic storage application. For example, an air gap 214 having a thickness of 50 $\mu$m will reduce the Strehl Ratio from 1 to 0.985 when one order of diffraction is included in the holographic storage medium. A further drop of Strehl Ratio from 1 to 0.772 occurs when 2 orders of diffraction are included. A holographic data storage system often requires a Strehl Ratio of more than 0.90 to ensure data fidelity in a system which uses a DMD encoded signal beam. In the first case, when one diffraction order is included in the storage medium, the prism coupler alone consumes 15% of the overall optical system's tolerance budget. In the second case, when two diffraction orders are included, the prism coupler alone would cause the optical system to fail to meet tolerance specifications.

Furthermore, ghost images may form due to multiple reflection of the light beam 208 in the air gap, since beam 208 is not incident on the air-prism interface 215 at the Brewster's angle.

Thus, a DMD coupler that preserves the optical quality of the "useful" illumination beam is needed.

SUMMARY

Briefly, and in general terms, the invention provides an improved method for illuminating a DMD, which provides for improved wavefront quality of the transmitted beam reflected off the DMD micro-mirrors. The invented DMD illumination coupler comprises an angularly selective reflective thin film, and has the characteristics of high optical quality.

A key to optimizing the wavefront quality of the "useful" illumination beam is to minimize refraction of the "useful" beam. This is achieved by a set of prisms positioned so that the "useful" illumination beam enters and exits the prisms at angles close to 90 degrees, and by the angularly selective thin film whose refractive index closely matches that of the prisms.

In one embodiment according to the present invention, the first right angle prism has a first hypotenuse surface, a first side surface and a second side surface. The second right angle prism has a second hypotenuse surface, a third side surface and fourth side surface, positioned so that the second side surface is attached to the third side surface. The third right angle prism has a third hypotenuse surface, a fifth side surface and a sixth side surface, positioned so that the third hypotenuse surface is attached to the second hypotenuse surface, and the sixth surface is opposite the third side surface. An angularly selective thin film is coated on the second hypotenuse surface or the third hypotenuse surface. The prisms are normally attached light curable cement whose refractive index substantially matches that of the prisms.

In the preferred embodiment, by way of example and not necessarily by way of limitation, the first and the second prisms described above are combined to form a single prism. This embodiment involves only two prisms instead of three prisms, and enables easier alignment procedures. The light path in this preferred embodiment is essentially the same as that in the alternative embodiment. For discussions purposes, we will describe the alternative embodiment in detail in the following sections.

A DMD is positioned so that a micro-mirror surface of a pixel, at its relaxed position, is parallel to the fourth surface of said second prism. The DMD comprises a matrix of micro-mirror pixels. A micro-mirror pixel assumes two positions in the operating mode. One position has the surface of the micro-mirror rotated clockwise, for 10 degrees as an example. Another position has the surface of the micro-mirror rotated counter-clockwise, for 10 degrees as an example.

An illumination beam is incident on the first hypotenuse surface, and is substantially parallel to said first side surface of said first prism. The beam is refracted by the first hypotenuse surface, reflected by the angularly selective thin film at the interface of the second and the third hypotenuse surface, and refracted by the fourth side surface of the second prism. The illumination beam is then incident on the surface of the micro-mirror of the DMD.

In an alternative embodiment, the first prism is a 45-45-90 degree prism; the second prism is a 30-60-90 degree prism, having its short side surface attached to a side surface of the first prism; the third prism is a 30-60-90 degree prism, having its hypotenuse surface attached to the hypotenuse surface of the second prism, and its short side surface parallel to the short side surface of the second prism. Preferably, all the prisms are made of a BK7 material. The illumination beam exits the long side surface of the second prism at an angle of approximately 20 degrees. When a micro-mirror of a DMD is oriented at 20 degrees clockwise, the "useful" illumination enters the long side surface of the second prism at a right angle. This beam passes the angularly selective thin film and exits the long side surface of the second prism at another right angle.

In the most preferred embodiment, the first 45-45-90 degree prism and the second 30-60-90 degree prism are combined to form a single prism which has four side surfaces and four corners.

The angles of the four corners are 45, 150, 30, and 135 degrees. The side surface between the 150 and 30 degree corners are attached to the hypotenuse side surface of the third 30-60-90 degree prism. The short side surface of the 30-60-90 degree prism is perpendicular to the side surface between the 45 and 150 degree corners of the 45-150-30-135 degree prism.

In a holographic storage application, the transmitted beam from the prisms is collected and used as the encoded signal beam. When the micro-mirror of the DMD is oriented counter-clockwise, the reflected beam is not received by a holographic storage medium.

The reflected beam from a micro-mirror of a DMD has a cone angle. This cone angle is caused by the diffraction of the micro-mirror due to its miniature size. This cone angle reduces the resolution of the optical system for holographic storage, and consequently reduces the capacity of the holographic storage material. Fortunately, since the "useful" illumination beam passes the prisms without significant refraction, the optical quality of the transmitted "useful" beam from the DMD coupler is not reduced.

Although the DMD coupler according to the present invention is designed to be used in holographic systems, it is also suited for image display systems. The characteristics of the DMD coupler ensure superior quality of images produced by such image display systems.

A detailed explanation of the invention is contained in the detailed specification with reference to the appended drawing figures.

DETAILED DESCRIPTION

Figure 1:
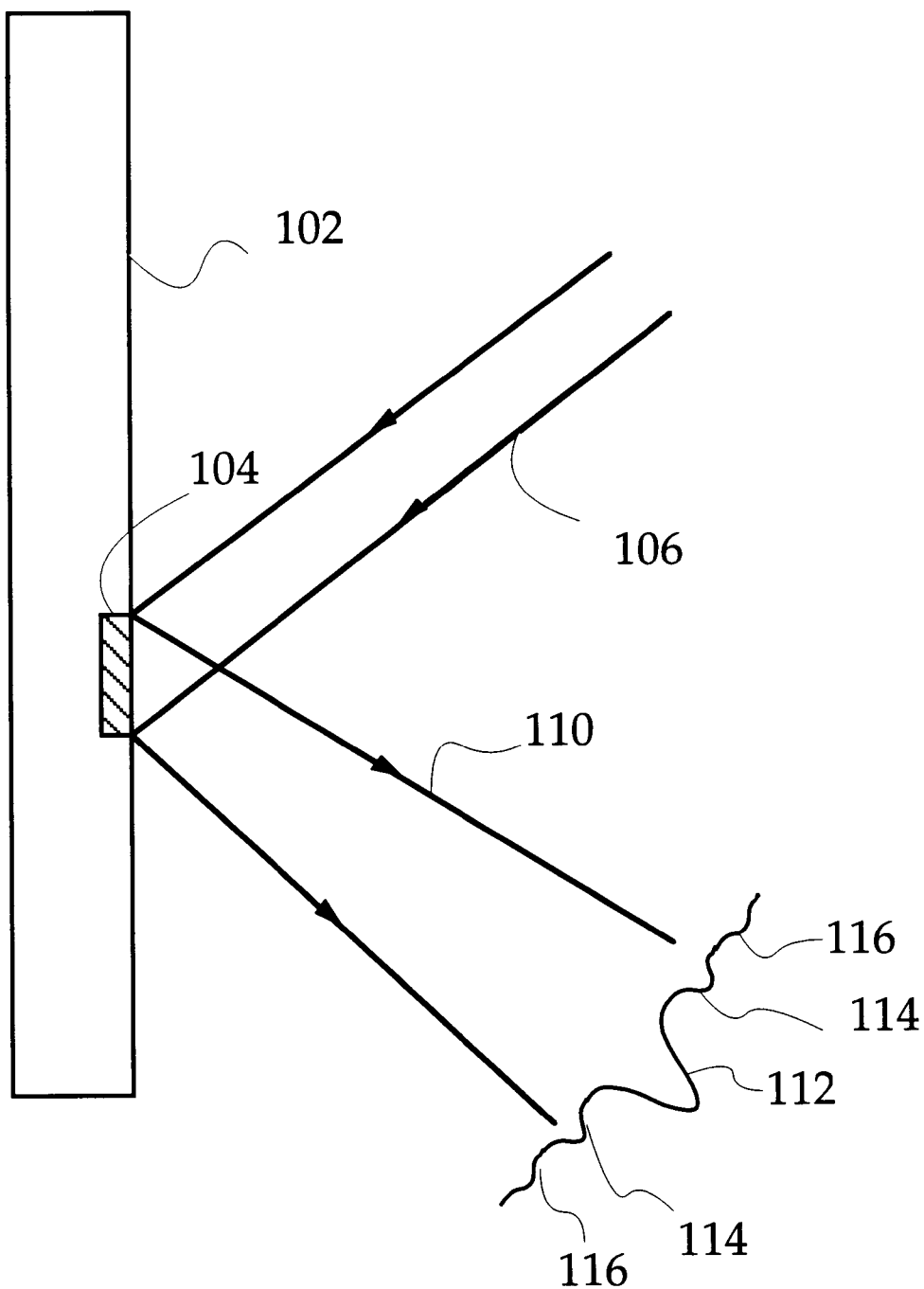
FIG. 1 is a schematic view illustrating a diffraction limited reflection beam from a micro-mirror pixel of a DMD.
Figure 2:
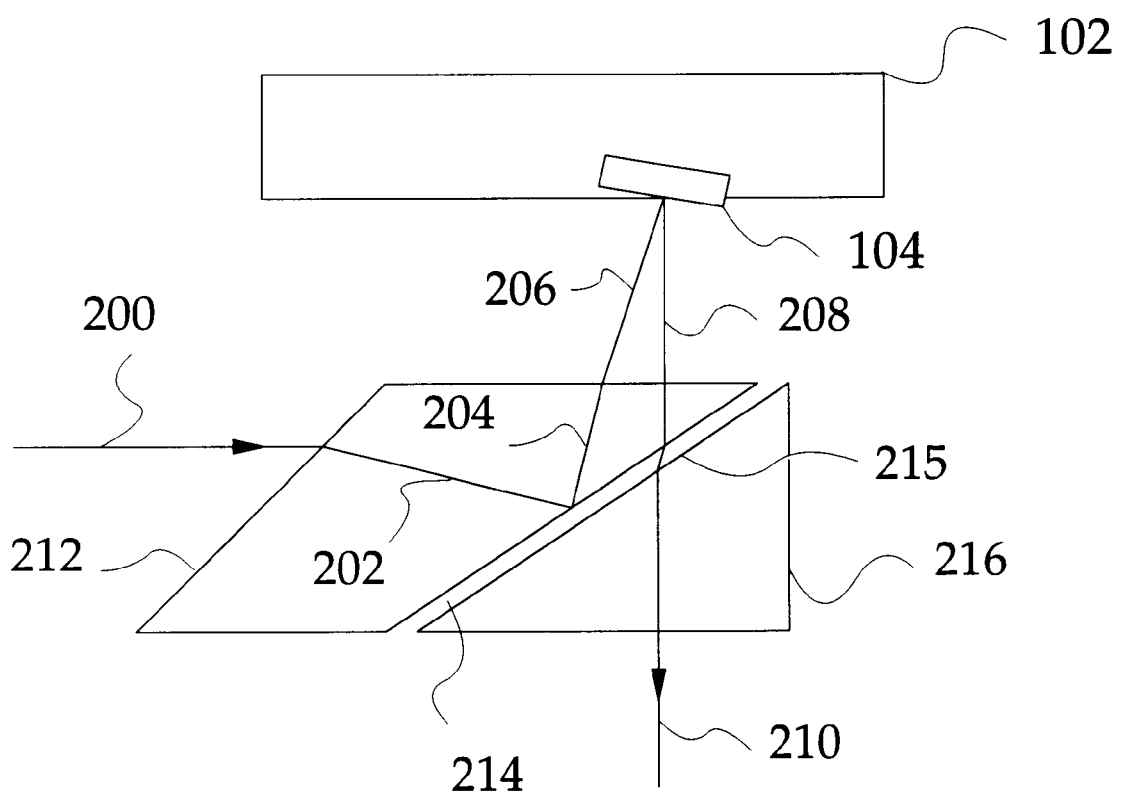
FIG. 2 is a schematic view illustrating a prior art arrangement of a DMD light coupler.
Figure 3A:
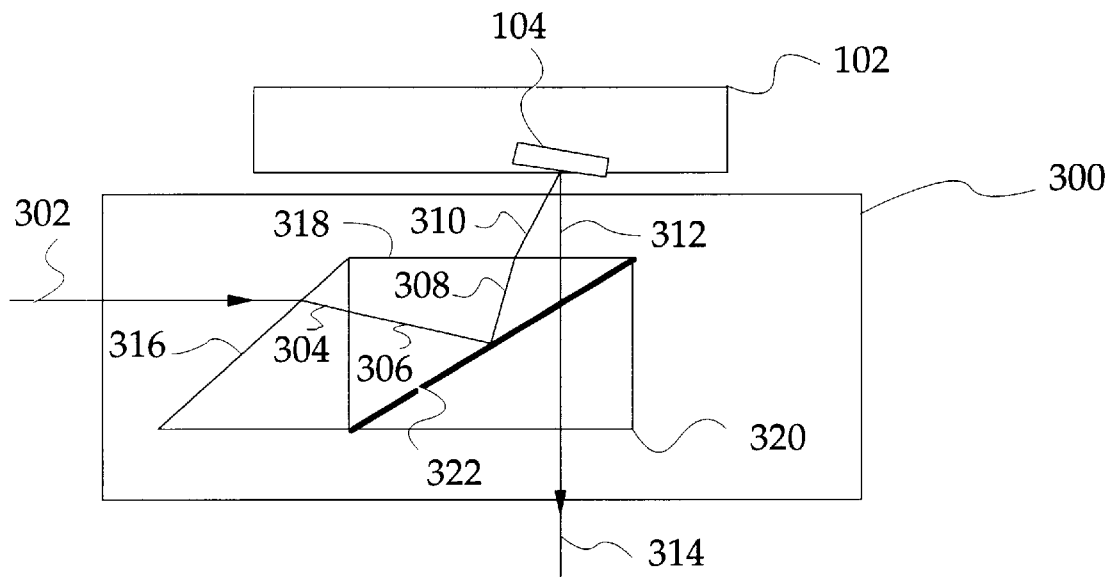
FIGS. 3A–B are schematic views illustrating an alternative and the preferred DMD light coupler according to the present invention.

FIG. 3 is a schematic drawing of an alternative embodiment of present invention. A DMD light coupler 300 comprises three prisms, a 45-45-90 degree prism 316, two 30-60-90 degree prisms 318 and 320, and an angular selective thin film 322. All of these prisms are commercially available. A side surface of the prism 316 is attached to a short side surface of the prism 318. The angle between the hypotenuse side surface of the prism 316 and the hypotenuse side surface of the prism 318 is 15 degrees. The hypotenuse side surface of the prism 320 is attached to the hypotenuse side surface of the prism 318, such that the short side surface of the prism 318 and the side surface of the prism 320 are parallel with each other. The angularly selective thin film 322 is coated on the hypotenuse surface of either the prism 318 or the prism 320.

An illumination light beam is divided into several portions. A first portion S(1) which is incident on the hypotenuse surface of the prism 316 is labelled as light beam 302. Light beam 302 is perpendicular to the side surface of the prism 316 which is attached to the short side surface of the prism 318. A second portion S(2) which is refracted by the first hypotenuse surface and incident on the second hypotenuse surface, comprises light beam 304 and light beam 306. Light beam 304 passes the prism 316 and enters the prism 318. Light beam 304 will be refracted at the interface of the prism 316 and the prism 318 if the two prisms are made of different materials. The light beam 306 is reflected by the angularly selective film 322. A third portion S(3) which is reflected by the angularly selective thin film 322, and incident on the fourth side surface is labelled as light beam 308. Light beam 308 is refracted at the long side surface of the prism 318. A fourth portion S(4) which is refracted by the fourth side surface and incident on the micro-mirror 104 of the DMD 102 is labelled as light beam 310. The micromirror 310 reflects light beam 310 to produce a fifth portion S(5), which is labelled as light beam 312. Light beam 312 is refracted by the fourth surface to produce the sixth portion S(6), labelled as light beam 314. A light beam 314, which passes through the DMD coupler 300, is the output beam of the DMD coupler 300.

The DMD 102 is positioned such that the micro-mirror 104, in its relaxed mode, is parallel to the long side surface of the prism 318. The micro-mirror 104 can rotate clockwise or counter clockwise about an axis extending from opposing diagonal corners by a predetermined angle when different voltage signals are applied to the micro-mirror pixel 104. The predetermined angles for most currently available commercial DMDs are appoximately 10 degrees.

In this alternative embodiment, all three prisms 316, 318 and 320 are made of a BK7 material. The light beam 310 exits the long side surface of the prism 318 at an angle of approximately 20 degrees. When the micro-mirror 104 is oriented clockwise by 10 degrees, the reflected light beam 312 is perpendicular to the long side surface of the prism 318. The light beam 312 enters the prism 318, and exits the prism 320 without any refraction. The light beam 314 is collected and subsequently used in a particular optical application. When the micro-mirror 104 is oriented counter clockwise by 10 degrees, the reflected beam of 310 is spatially separated from the light beam 310, and is normally blocked from the viewing device. Since the incident light beam 302 is parallel to a side surface of the prism 312, and perpendicular to another side surface of the prism 312, the alignment procedure is very simple. All of the prisms used in the DMD coupler 300 in this embodiment are comercially available.

This embodiment is particularly designed to work with a DMD which swivel at 10 degrees. However, the present invention can be adapted to a DMD which swivel at an angle other than 10 degrees, by changing the materials of the prisms, and the angles of prism 316. A person of average skill in the art will be able to determine the combination of materials and angles of the prisms without undue experimentation. According to this aspect of the invention, the invented DMD coupler is easily modifiable and versatile.

A distinct feature of the present invention, in comparison with the prior art, is the use of an angularly selective thin film 322 instead of the air gap 214. The angularly selective thin film 322 has two important characteristics that improve the optical quality of the output beam from the DMD coupler. First, the angularly selective thin film has a thickness of only a few microns or less, which is significantly thinner than the air gap 214. Second, the angularly selective thin thin film 322 has a refractive index which is close to that of the materials of the prisms 318 and 320. For the above two reasons, the optical quality of the reflected illumination beam from the DMD, as measured by e. g. the Strehl Ratio, is significantly improved by using the angularly selective thin film. Furthermore, the air gap 214 in the prior art can create multiple ghost images when the light beam 208 is reflected many times inside the air gap. These ghost images would cause a reduction in image contrast which may be critical in data storage. The application of an angularly selective thin film can eliminate this problem. Total internal reflection(TIR) at an air gap can work with broadband illumination light, and yet the angularly selective thin film works best with mono-chromatic illumination. On the other hand, a DMD coupler which can work with a monochromatic light source is sufficient in a holographic storage application that utilizes a single wavelength.

An angularly selective thin film can include different portions each of which selectively work with different wavelengths. These portions can correspond to physically distinct parts of the film, or to differnt spatial frequencies. An example is a film having a portion that works with red light and a different portion that works with green light.

Another distinct feature of the present invention is that the DMD coupler 300 comprises three prisms. It is easy to compensate the dispersion by choosing a right combination of materials for different prisms. Normally, the prism 318 and the prism 320 are made of the same type of material. The prism 316 can be made of a different material. Table 1 shows the dispersion of light between 488 and 680 nm, and the residual error at 532 nm for different combinations of materials of the prisms. The residual error is defined as the departure from precise specifications of incident angle with respect to DMD. A person of average skill in the art will be able to determine the specific choice based on system tolerances and cost considerations.

TABLE 1

| material of prism 316 | material of prism 318 and 320 | residual error at 532 nm (mrad) | dispersion 488–680 nm (mrad) |
| --- | --- | --- | --- |
| BK7 | BK7 | −8.5 | 3.1 |
| K7 | B270 | 1 | 2.9 |
| SK5 | LAK21 | −1.2 | 2.8 |
| PK51A | BK7 | 0.7 | 1.8 |
| LAK21 | LAK10 | −0.5 | 1.4 |
| SK51 | LAFN23 | −1.1 | 1.1 |

Figure 3B:
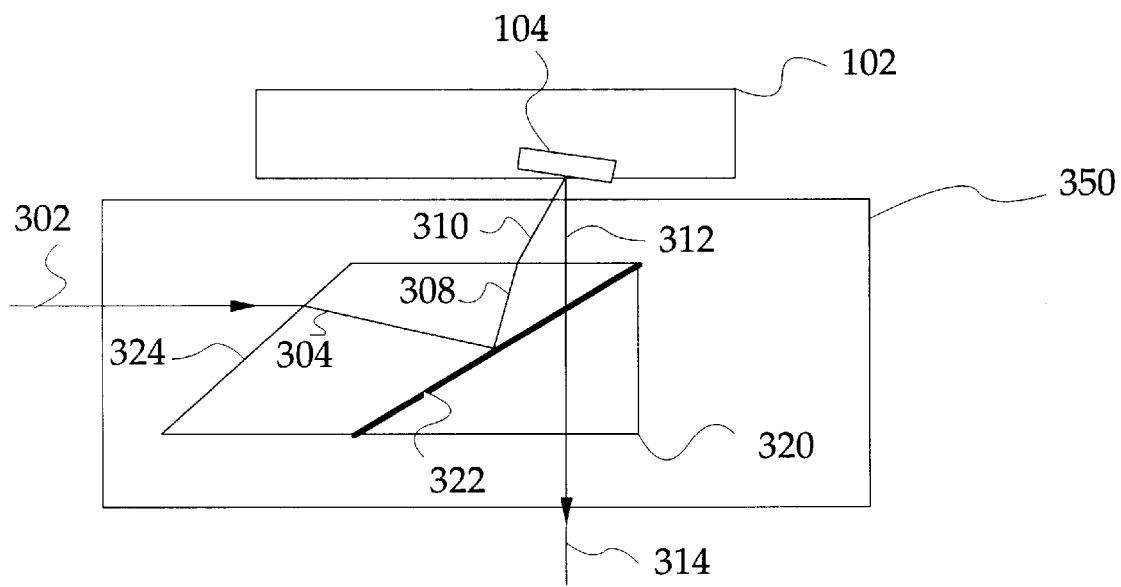

The prism 316 and the prism 318 in the embodiment 300 can be combined to form a single 45-150-30-135 degree prism 324, as is shown in FIG. 3B. This embodiment 350 is preferred because it not only takes the advantage of the angularly selective thin film 322 to preserve the wavefront quality of the light beam 314, but also uses two prisms instead of three prisms such that the alignment procedures are simplified. This embodiment 350 is similar to the alternative embodiment 300 described above.

Figure 4:
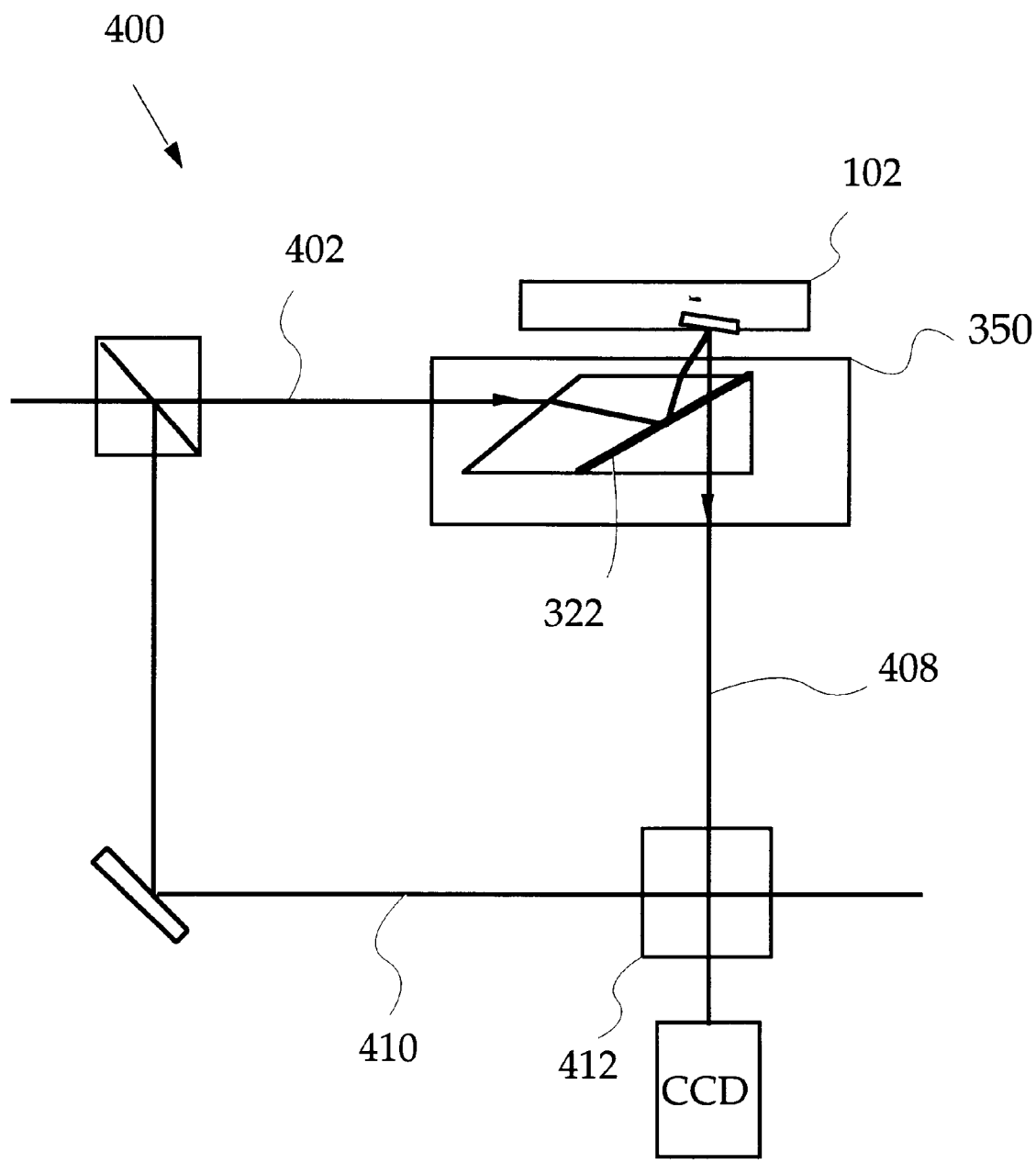
FIG. 4 is a schematic view illustrating a holographic storage system having a DMD coupler according to the present invention.

FIG. 4 is a simple schematic view of a holographic storage system 400 incorporating a DMD 102 and a DMD coupler 350. A signal beam 402 is coupled to the DMD 102 by the DMD coupler 350. A DMD encoded signal beam 408 passes through the DMD coupler 350. The DMD encoded beam 408 interfere with a reference beam 410 inside a holographic storage medium 412. The interference pattern which contains an image information created by the DMD 102 is then recorded in the holographic storage medium 412. The optical quality of the DMD encoded beam 408 is critical to the performance of the holographic storage system 400.

Generally, the DMD encoded signal beam 408 is diffraction limited due to diffraction caused by the micro-mirrors of the DMD 102. The optical quality of the DMD encoded signal beam 408 is generally reduced by such effects as refraction and multiple reflection if prior art DMD couplers are used. As a result, the resolution of the holographic system 400 will be reduced. DMD coupler 350 use a angular selective thin film 405 to replace an air gap used in the prior art. As discussed in the previous sections, the angular selective thin film 405 has a thickness which is much thinner than the air gap used to the prior art. In addition, the refractive index of the angular selective thin film is close to that of the prism material. Consequently, the DMD coupler 350 according to the present invention eliminates the problems of beam refraction and multiple reflection. The optical quality of the DMD encoded signal beam 408 is preserved when it passes through the DMD coupler 350. Furthermore, the angular selective thin film 405 of the DMD coupler 350 works well with a mono-chromatic signal beam normally used in a holographic storage system that utilizes a single wavelength.

In view of the above, the scope of the invention should be determined by the following claims and their legal equivalents.

What is claimed is:

1. A apparatus for coupling an illumination light to a digital micro-mirror device (DMD) and for preserving a wavefront property of a useful illumination light, wherein said DMD has a plurality of micro-mirrors, and each micro-mirror is adjustable between a first position and a second position, and said useful illumination light is a reflection of said illumination light by at least one of said micro-mirrors in said first position, comprising:
    a) a first prism comprising a first side surface, a second side surface and a third surface;
    b) a second prism comprising a fourth side surface, a fifth side surface and a sixth side surface, wherein said fourth side surface is substantially adjacent to said second side surface;
    c) an angularly selective film, positioned between said second side surface and said fourth side surface, having a predetermined thickness and a profile index of refraction;
wherein:
said illumination light enters said first side surface, is reflected by said angularly selective film at said second surface at a first angle, exits said third side surface, is incident on said micro-mirrors, and
said useful illumination light enters said third side surface at a substantially normal angle, passes said first prism, exits said second side surface, passes said angularly selective film at a second angle, enters said fourth side surface, passes said fifth side surface at a substantially normal angle.

2. The apparatus of claim 1 wherein said angularly selective film is substantially thin.

3. The apparatus of claim 1 wherein said refractive index profile of said angularly selective film is substantially close to a refractive index of said first prism.

4. The apparatus of claim 1 wherein said angularly selective film includes different portions for different wavelengths.

5. The apparatus of claim 1 wherein said angularly selective thin film is coated on said second side surface.

6. The apparatus of claim 1 wherein said angularly selective film is coated on said second side surface, and selectively reflects an incident light at said first angle.

7. The apparatus of claim 6 wherein said coated second side surface is attached to said fourth side surface by a cement.

8. The apparatus of claim 1 wherein said angularly selective film is coated on said fourth side surface, and selectively reflects an incident light at said first angle.

9. The apparatus of claim 8 wherein said coated fourth side surface is attached to said second side surface by a cement.

10. The apparatus of claim 1 wherein said first prism and said second prism are composed of a material of the same type.

11. The apparatus of claim 1 wherein said first prism and said second prism are right angle prisms, and said second side surface and said fifth side surface are hypotenuse surfaces, and said third and fifth side surfaces are parallel.

12. The apparatus of claim 11 further comprising a third right angle prism having a seventh side surface, a eighth side surface and a ninth side surface, wherein said ninth side surface is a hypotenuse side surface, said eighth side surface is attached to said first side surface.

13. The apparatus of claim 12 wherein said first prism and said second prism are attached by a light curable cement.

14. The apparatus of claim 13 wherein:
    a) said third prism is a 45-45-90-degree prism;
    b) said first prism is a 30-60-90-degree prism, said first side surface is a short side surface, and said ninth side surface and said first side surface form an angle of 15 degrees;
    c) said second prism is a 30-60-90-degree prism, said fifth surface is a long side surface;
    d) said illumination light is parallel to said seventh side surface, and is incident on said ninth side surface, passes said third and first prisms, reflected by said angularly selective film, exits said third side surface at an angle of approximately 20 degrees.

15. The apparatus of claim 14 wherein said first, second and third prisms are composed of a material of the same type.

16. The apparatus of claim 14 wherein said first prism and said second prism are composed of a material of the same type, and said third prism is composed of a material of a different type.

17. The apparatus of claim 14 wherein said ninth side surface and said third side surface are covered with anti-reflection coating.

18. The apparatus of claim 1 wherein said first prism is a 45-150-30-135 degree prism, a side surface between the 45 and 135 degree corners of said 45-150-30-135 degree prism is said first side surface, a side surface between the 150 and 30 degree corners of said 45-150-30-135 degree prism is said second side surface, and a side surface between the 30 and 135 degree corners of said 45-150-30-135 degree prism is said third side surface.

19. The apparatus of claim 18 wherein said second prism is a 30-60-90 degree prism, a hypotenuse side surface of said 30-60-90 degree prism is said fourth side surface, a short side surface of said 30-60-90 degree prism is perpendicular to a side surface between the 45 and 150 degree corners of said first prism.

20. A method for coupling an illumination light to a digital micro-mirror device (DMD) and for preserving a wavefront property of a useful illumination light, wherein said DMD has a plurality of micro-mirrors, and each micro-mirror is adjustable between a first position, a second position and a relaxed position, and said useful illumination light is a reflection of said illumination light by at least one of said micro-mirrors in said first position, comprising:
    a) providing a first prism comprising a first side surface, a second side surface and a third surface;
    b) providing a second prism comprising a fourth side surface, a fifth side surface and a sixth side surface, wherein said fourth side surface is substantially adjacent to said second side surface;
    c) providing an angularly selective film, positioned between said second side surface and said fourth side surface, having a predetermined thickness and index of refraction;

wherein:

said illumination light enters said first side surface, is reflected by said angularly selective film at said second surface at a first angle, exits said third side surface, is incident on said micro-mirrors, and said useful illumination light enters said third side surface at a substantially normal angle, passes said first prism, exits said second side surface, passes said angularly selective film at a second angle, enters said fourth side surface, passes said fifth side surface at a substantially normal angle.

21. The method of claim 20 further comprising a step of eliminating air gap between said second side surface and said fourth side surface.

22. A apparatus for encoding a signal beam in a holographic imaging system, comprising:
   a) a digital micro-mirror device (DMD) having a plurality of micro-mirrors, and each micro-mirror is adjustable between a first position, a second position and a relaxed position,
   b) a light coupler comprising:
      a first prism comprising a first side surface, a second side surface and a third surface;
      a second prism comprising a fourth side surface, a fifth side surface and a sixth side surface, wherein said fourth side surface is substantially adjacent to said second side surface;
      an angularly selective film, positioned between said second side surface and said fourth side surface, having a predetermined thickness and index of refraction;

wherein:

an encoded signal beam is a reflection of said signal beam by at least one of said micro mirrors in said first position;

said signal beam enters said first side surface, is reflected by said angularly selective film at said second surface at a first angle, exits said third side surface, is incident on said micro-mirrors, and said encoded signal beam enters said third side surface at a substantially normal angle, passes said first prism, exits said second side surface, passes said angularly selective film at a second angle, enters said fourth side surface, passes said fifth side surface at a substantially normal angle.

\* \* \* \* \*

UNITED STATES PATENT AND TRADEMARK OFFICE
CERTIFICATE OF CORRECTION

PATENT NO. : 6,023,365
DATED : February 8, 2000
INVENTOR(S) : Mark E. McDonald

It is certified that error appears in the above-identified patent and that said Letters Patent is hereby corrected as shown below:

<u>Title page,</u>
Item [75], please correct inventor name from "Mark McDonald" to -- Mark E. McDonald --.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*